April 12, 1966  J. W. CONLEY  3,245,794
SEQUENTIAL REGISTRATION SCHEME
Filed Oct. 29, 1962  3 Sheets-Sheet 1

INVENTOR.
JAMES W. CONLEY
BY
AGENT

April 12, 1966 J. W. CONLEY 3,245,794
SEQUENTIAL REGISTRATION SCHEME
Filed Oct. 29, 1962 3 Sheets-Sheet 2

INVENTOR.
JAMES W. CONLEY
BY
AGENT

April 12, 1966  J. W. CONLEY  3,245,794
SEQUENTIAL REGISTRATION SCHEME
Filed Oct. 29, 1962  3 Sheets-Sheet 3

INVENTOR.
JAMES W. CONLEY
BY
AGENT

United States Patent Office 3,245,794
Patented Apr. 12, 1966

3,245,794
SEQUENTIAL REGISTRATION SCHEME
James W. Conley, Cambridge, Mass., assignor to Philco Corporation, Philadelphia, Pa., a corporation of Delaware
Filed Oct. 29, 1962, Ser. No. 233,780
6 Claims. (Cl. 96—44)

This invention relates to improvements in the technology of fabricating microminiaturized components and more particularly to an improved method and means for fabricating solid state devices utilizing a multistep photomechanical reproduction process.

To improve the uniformity and reliability of such components and to reduce their cost of manufacture it is desirable that they be produced and processed in large numbers simultaneously.

In achievement of this end it has been the practice of the prior art, as for example in the production of solid state devices such as planar and mesa transistors, to produce thousands of these devices in a single wafer of semiconductive material using a multistep photomechanical reproduction process. The prior art technique for fabricating devices in this manner has been to use a series of masks each containing a repetitive array of a single element of the multiple element array required for the fabrication of the device, and then by a succession of alignment and fabricating steps to construct the finished product. The stencil or mask which is employed may take the form of a suitably apertured thin metal foil or a glass plate coated with a photographic emulsion processed to produce an array of opaque images on a transparent background, or vice versa, which images on any particular mask are representative of one of the elements to be reproduced in the semiconductive wafer. The mask is normally used as a negative to expose a thin film of photosensitive material previously deposited on the wafer of semiconductive material in which the semiconductor devices are to be constructed. Upon development, the unexposed resist material dissolves away, but the exposed resist remains in place to act as a selective mask against the action of certain chemicals.

To place the invention in proper perspective, and greatly to facilitate understanding thereof, the steps in manufacturing a planar, double-diffused, silicon transistor using prior art techniques are described below. The first step, given a suitable wafer of single crystal silicon, is thermally to grow on the wafer an oxide layer a few microns thick. Next a photosensitive resist material such, for example, as Kodak Photo Resist (KPR) is applied over the oxide and the surface is selectively exposed through a photomask, of the type described, to define a great plurality of individual base diffusion areas. The wafer is chemically processed to remove the unexposed resist material from over the base areas. The exposed oxide is then removed by an acid etch, such as hydrofluoric acid, the resist material defining the base areas not being attacked. The resist overlay is next removed and base diffusion performed using for example, a boron compound. Diffusion is restricted to the exposed silicon surface by the oxide overlay. The boron diffuses laterally under the oxide into the silicon as well as in a forward direction. Oxide is regrown over the base region during the diffusion process. The emitter area is defined by a second photomaking and etching process similar to that just described, the emitter diffusion being carried out using a phosphorus compound, the oxide again masking all but the desired region. A third photomasking etching operation defines the base and collector contact regions after which aluminum or other suitable contact material is evaporated over the wafer to form the contact. Another and final photomasking step is used to remove the aluminum from the unwanted areas. By this technique thousands of transistors may be formed on a single wafer of silicon. The wafer may then be scribe cut into individual transistor wafers preliminary to their installation in stems and to their use in other applications.

The described process requires, as a minimum, the use of four high precision photomasks, each of which is difficult to make and each of which must be placed in accurate registration with the pattern laid down by the previous mask in order to produce a satisfactory end product. The problem of avoiding accumulation of error, is both difficult and expensive and one whose difficulty is directly proportional to the number of patterns required for reproduction. This problem is particularly aggravated by the precise dimensional control which must be maintained during successive mask alignments.

It is accordingly a general object of the present invention to provide a method and means for overcoming the above mentioned alignment limitations of the prior art.

It is a further and more particularized object of this invention to provide a new concept of alignment for use in the mass fabrication of microminiaturized components by photomechanical means which both eliminates the need for multiple masks and the criticality of dimensioning heretofore required between adjacent patterns on the same mask.

Still another object of the invention is to provide an alignment method for use in multistep photolithographic processing of solid state devices of the type described which results in extension of the accuracy which is currently obtainable using prior art techniques.

It is a still further object of the invention to provide a simplified and inexpensive means and procedure for the achievement of these ends.

These, and other objects and features of the present invention will be apparent from a consideration of the following detailed description taken in conjunction with the accompanying drawings, in which.

Figure 1:
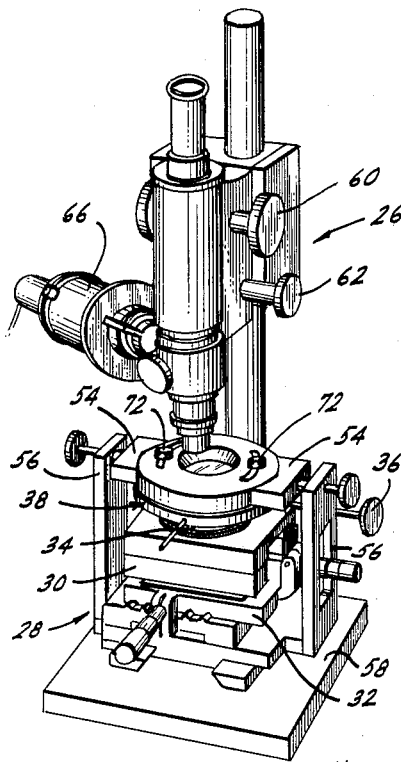
FIGURE 1 is a perspective view of one form of apparatus utilizable in the practice of the present invention.

While the invention has application to multistep photomechanical reproduction processes generally, it will be illustrated and described in connection with its use in the mass fabrication of small area planar transistors. This specific application of the invention, however, should not be construed as restrictive of its scope, the application being merely illustrative of one aspect thereof.

The principal attribute of the invention is the simplicity which it imports into the photofabricating art, by permitting replacement of the conventional multimask system by a single mask containing a plurality of composite image arrays. For example, a planar double-diffused silicon transistor has three basic elements requiring reproduction by photomechanical means, the base, emitter, and contact elements. To mass produce these devices on a microminiaturized scale requires a high degree of precision of alignment between successive element reproductions. The prior art, as above indicated, utilizes individual masks each of which contains a single specific element progenitor in multiple array which arrays are aligned with images previously generated to complete the various phases of fabrication. As will be apparent, this technique requires extremely precise spacing between each of the elements on each mask so that the required registration between successive marks and patterns can be maintained.

In its simplest method aspect the present invention consists of providing a single mask containing composite arrays of the elements necessary to the complete fabrication of the particular device, arranged in family groups. By this arrangement the prior art need for precise spacing between successive elements of a plurality of identical devices, is eliminated since individual elements have been replaced by composite arrays in which the required dimensional control is measured from a single point of reference or nodal point in each family group. By using a single reference point in each grouping as the control, the problem of cumulative error is completely obviated. By this technique the fabricating process is both simplified and the accuracy attainable greatly improved.

The mask containing a plurality of these individual groupings or composite families of elements is then utilized photographically to generate, on a light-sensitized surface of a wafer of semiconductive material, or other appropriate substrate, a repetitive pattern of images of an identical one of said elements from each of said family arrays. °While this results in the random printing of the other images comprising the array, it is of no practical significance for the reason that the clearance required to be left around each device for purposes of scribe cutting more than compensates for the space consumed by this incidental printing. The images produced are then developed and the wafer processed in the manner previously described to remove the exposed oxide and to effect localized diffusion treatment of the underlying semiconductive substrate. This is followed by a second alignment procedure in which a second element from each family array of the same mask is aligned with a corresponding first image of that family array. Alignment of each of the plurality of family arrays is accomplished by simply aligning a set of family arrays at widely separated locations. This results automatically in bringing every other family array into precise registration.

To facilitate a better understanding of the proposed sequential registration scheme the procedure will be described in detail in connection with the fabrication of a planar, double-diffused, silicon transistor.

The material on which the devices are to be generated consists of a single crystal 10 which may be of low resistivity silicon 5–10 mils thick on the surface of which there is thermally grown a thin oxide layer 12 a few microns thick. The oxide surface is coated with a layer of photosensitive resist material 14 such, for example, as Kodak Photo Resist (KPR), Kodak Metal Etch Resist (KMER) or diluted Kodak Photosensitive Lacquer (KPL). Only a fragmental portion of the entire wafer normally employed is shown in FIGURES 6 through 10, FIGURE 6 diagrammatically depicting the wafer fragment as it would appear in the inital phase of fabrication coated with a resist overlay 14.

Figure 4:
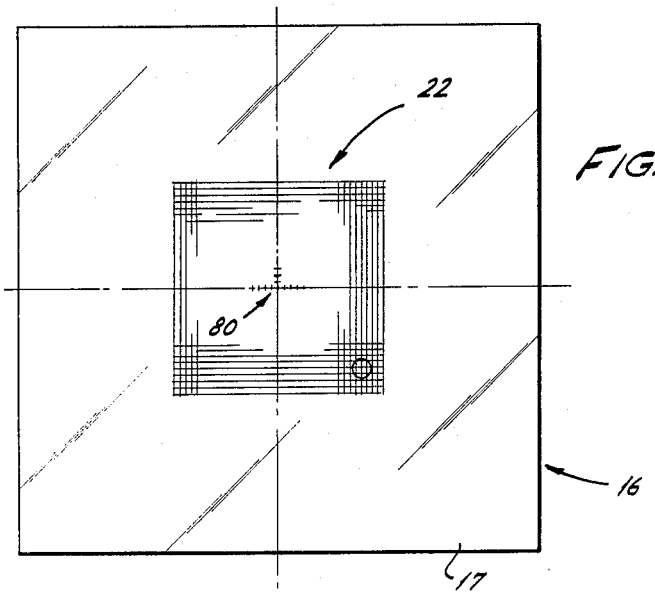
FIGURES 4 and 5 illustrate details of a photomask embodying features of the present invention, FIGURE 5 being a greatly enlarged showing of the circled area seen in FIGURE 4.
Figure 6:
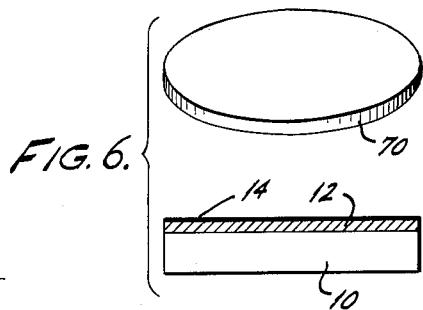
FIGURE 6 is a fragmental showing of a semiconductive wafer preparatory to treatment by the unique photofabricating process comprising this invention.
Figure 5:
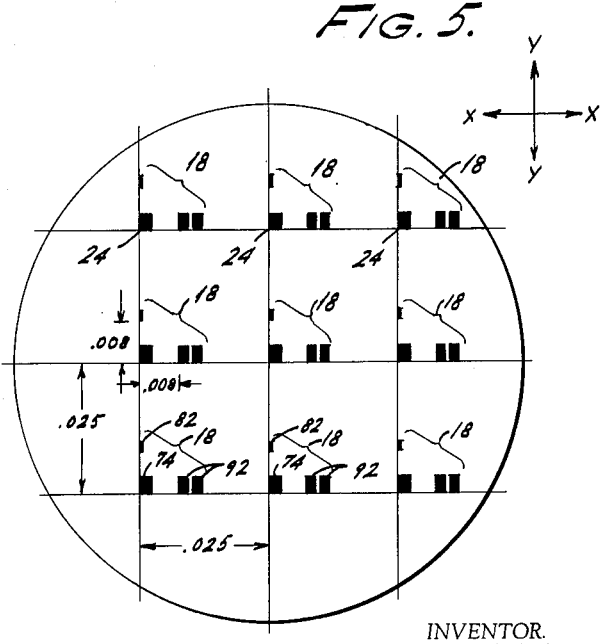
Figure 7A:
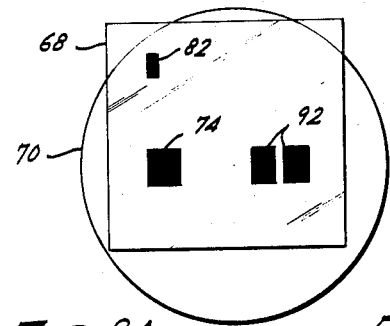
FIGURES 7A through 10C are a series of enlargements graphically depicting steps in the alignment procedure comprising the method aspects of the invention.
Figure 7B:
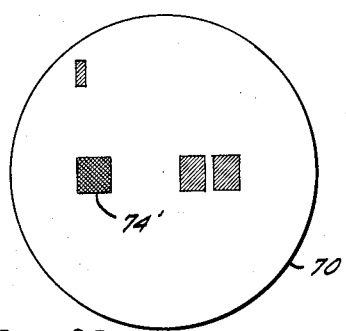
Figure 7C:
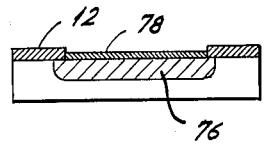

The next step is photographically to generate a plurality of base diffusion areas on the sensitized surface of the wafer using a photomask 16 prepared in accordance with the present invention. As seen in FIGURES 4 and 5 the mask consists of a glass plate 17 on which there is photographically produced a plurality of arrays 18 of opaque images laid down as triplets on a grid 22 having a 25 mil spacing. The right hand element of each array is a composite member. Each array contains a family of images necessary to the production of a complete semiconductor device inclusive of contacts. Identical elements in each array have the same spacing with respect to a given point of reference in the array. In the illustrated embodiment the common or nodal point of reference in each array has been chosen as the point of intersection 24 of the coordinates forming the grid work 22. By this technique the need for high precision spacing between successive arrays is eliminated, it only being necessary to maintain precision as respects the individual elements within each array, and for all arrays to have identical angular disposition.

Figure 3:
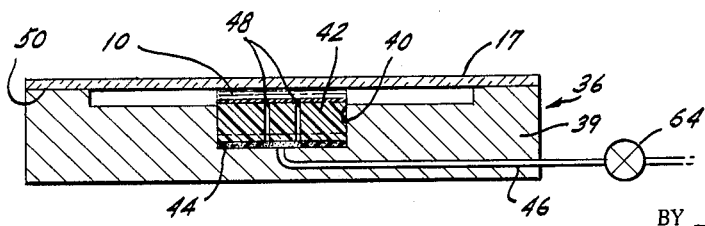
FIGURE 3 is a sectional elevational view of the wafer elevator.

To provide the precision of alignment required, a modified metallugical microscope 26 is employed. The microscope has a composite stage 28 composed of two micrometer-adjustable bed plates 30 and 32 translatable respectively in the X and Y coordinate directions. Mounted to the upper plate 30 is a circular member 34 constructed and arranged for rotational adjustment through micromanipulation of knob 36. Adapted for securement to the member 34, is a wafer holder 38. The holder is a composite structure comprised of a centrally recessed member 39 (see FIGURE 3) provided with an axially located bore 40 housing a vertically reciprocable cylinder or elevator 42. The elevator is movable into its fully extended position by an underlying foam rubber annulus 44 seated within the cylindrical bore 40. Communicating with the cavity underlying the elevator is a vacuum line 46. To facilitate securement of the semiconductive wafer 10 to the elevator the vacuum system is vented to the ambient atmosphere through a series of small bores 48 extending through the body of the elevator 42.

Figure 2:
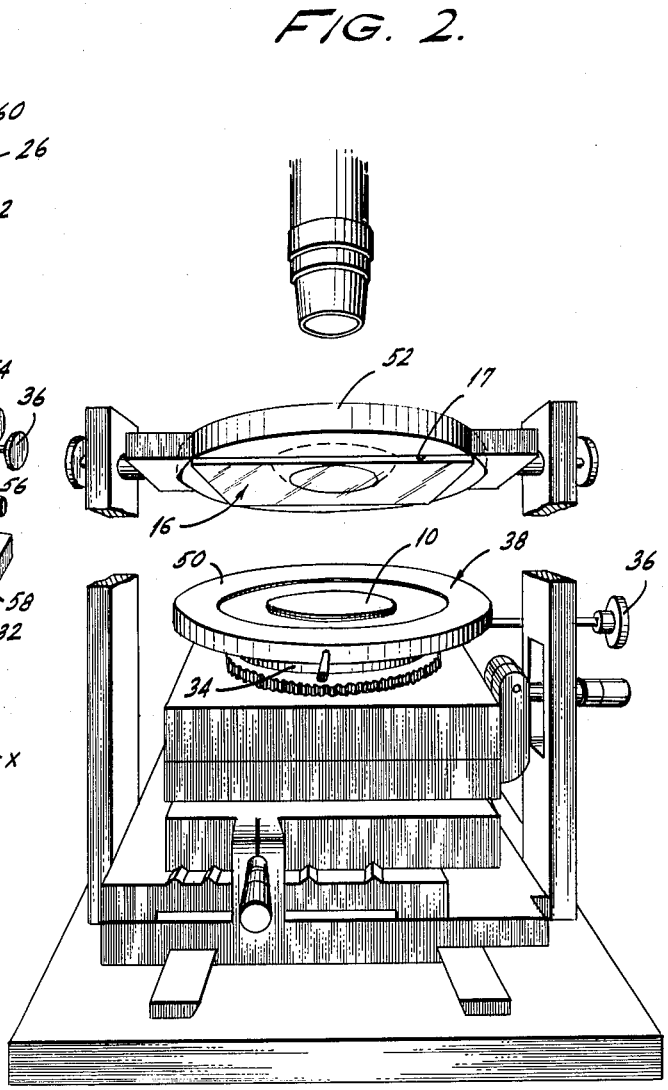
FIGURE 2 is an exploded view showing constructional details of the apparatus shown in FIGURE 1.

To prepare the wafer 10 for base diffusion it is placed on the elevator 42 with its sensitized surface 14 facing upward, as viewed in FIGURE 2. The wafer is secured to the elevator by applying vacuum to the system. This action also results in retraction of the elevator to the full line position shown in FIGURE 3 placing the upper surface of the wafer below the upper surface of the annular rim 50. The photomask 16 is then secured to the mask holder ring 52, as by globules of wax not shown, and the assembly placed on the wafer holder 34. The assembly is aligned on the holder by orienting pins not shown. The glass plate 17 rests on the rim 50 of the wafer holder 38 with its emulsion side facing downward out of contact with the wafer 10. The ring 52 is locked in fixed position by tightening the side clamps 54 supported in standards 56 secured to the microscope base structure 58. The microscope adjustment heads 60 and 62 are then manipulated to focus the microscope on the emulsion plane of the photomask after which the vacuum bleed valve 64 is opened and the elevator permitting to rise into a position placing the sensitized surface of the wafer in contact with the emulsion side of the mask. During the microscope alignment phases of the process an ultra-violet filter must be placed over the focussing objective to prevent exposure of the resist material by the microscope lamp 66. When the wafer and mask are in proper alignment, as diagrammatically shown in FIG- URE 7A by reference to fragmental portions 68 and 70, of the mask and wafer respectively, the thumb screws 72 are tightened to lock the wafer and mask holders together. The assembly is then removed from the alignment fixture and the light-sensitized material exposed to produce on the wafer surface the pattern shown in FIGURE 7B. It will be understood, of course, that a great number of such patterns, arranged in family arrays, are produced simultaneously. The portion of the pattern which comprises the opaque mask image 74 is used to generate in the sensitized surface of the wafer an exposed area 74′ which in turn is used in producing the base diffusion zone 76 shown in FIGURE 7C. The remaining reproductions are merely random printings which serve no useful purpose. Following this the wafer is developed and chemically processed, in the manner previously described, to produce the base diffused area 76. Oxide 78 is thermally regrown over this area during the diffusion phase of the process leaving a depression, which delineates the area previously defined by the mask base image.

Figure 8A:
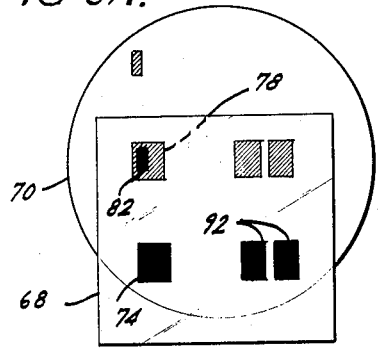

To produce the emitter diffused area the wafer is again coated with photoresist material and placed in the alignment fixture. To permit rough alignment of the mask and wafer the photomask is provided with a centrally located registration target 80 (FIGURE 4). This target is reproduced on the wafer after the first series of processing steps, the wafer retaining residual image of the target as a result of oxide regrowth during base diffusion. By registering these targets the base diffused transistor patterns are aligned to a first degree of approximation. As seen in FIGURE 5, the arrays are laid out on a 25 mil grid pattern the emitter and contact element included in each three-element array (element 92 being composite in form) being spaced 8 mils from the indexing reference point 24 of each array. Accordingly, once alignment of the registration targets is achieved, an 8 mil displacement of the wafer relative to the mask along the Y coordinate accurately positions the emitter mask image 82 at the index position of each array. When this degree of alignment has been attained the emitter images 82 are centrally aligned within the left hand half of each oxide depression 78 as shown in FIGURE 8A by minute adjustment of the micrometer stages. Since the spacing between the base and the emitter areas in each array is identical, i.e., within the accuracy capabilities of present day reproduction processes, which is about one tenth of a mil, alignment of a pair of patterns results in the automatic, simultaneous alignment of every other set of patterns. It will accordingly be seen that by reducing the alignment requirements to that called for by a single family group or array and by maintaining identical spacing between the elements comprising each family array, and an identical fixed point of reference in each array, the problem of cumulative error is eliminated and the acuity of reproduction greatly improved. As previously indicated this permits any number of semiconductor devices to be fabricated simultaneously and eliminates the need for separate masks each containing a repetitive array of a single semiconductor element.

Figure 8B:
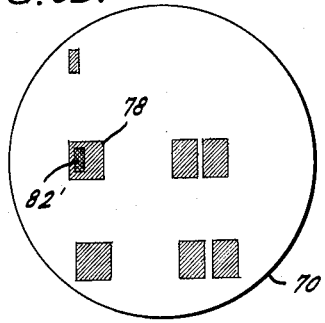
Figure 8C:
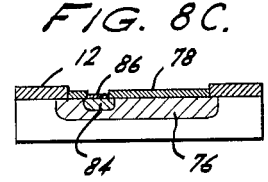

When the emitter pattern 82 is accurately registered with respect to the base diffused area the mask and wafer are again secured together and the assembly removed from the alignment fixture and the wafer exposed to produce the patterns shown in FIGURE 8B. Following this the wafer is chemically processed to produce the emitter diffused area 84 as seen in FIGURE 8C. An oxide coating 86 is regrown over the emitter diffused area 84 during diffusion, visual trace of the emitter zone remaining.

Figure 9A:
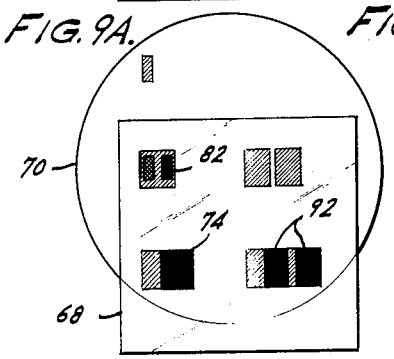
Figure 9B:
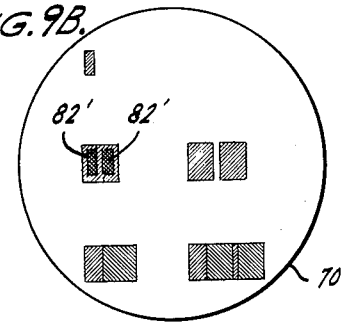
Figure 9C:
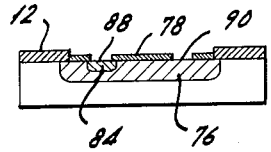
Figure 10A:
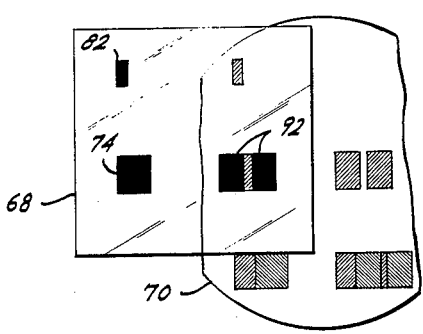
Figure 10B:
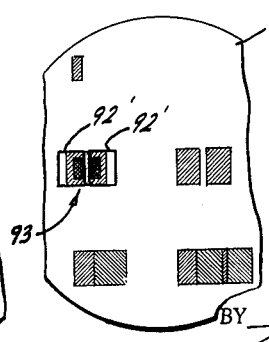
Figure 10C:
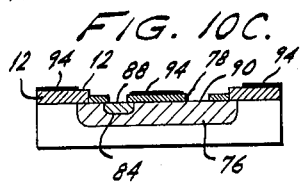

The steps graphically shown in FIGURES 8A and 8B are repeated to produce the emitter contact cut 88 seen in FIGURE 9C. The emitter image 82 is next positioned over the right half of the base diffused area in the manner shown in FIGURE 9A and the wafer exposed and processed to produce the base contact cut 90. It is possible to use the same emitter image 82 in the production of the emitted diffused zone and the emitter contact cut without fear of overlapping onto the surrounding base diffused area for the reason that diffusion proceeds both laterally as well as forwardly resulting in a diffusion pattern which is somewhat larger than the area defined by the emitter image. As indicated the base contact cut is produced by a second series of operations by simply aligning the emitter image so as to be centrally located over the right half of the base diffused area. After the semiconductive wafer has had the oxide removed in these two locations it is again sensitized and the contact land pattern, defined by the contact images 92, are photographically reproduced on its surface in the manner shown in FIGURES 10A, 10B and 10C. This step of the process leaves remaining on those surfaces on which metallizing is unwanted a residue of resist material 94. As will now be understood the desired end product formed by practice of the above method steps comprises the complete transistor shown at 93 in FIGURE 10B, the adjoining printings being merely incidental to the process.

The wafer, with the desired pattern integrally formed in the resist overlay is then placed within an evacuated chamber and a suitable metal, such as aluminum, vapor deposited over its surface. Metallizing may be done by conventional metal-evaporation techniques.

Figure 11:
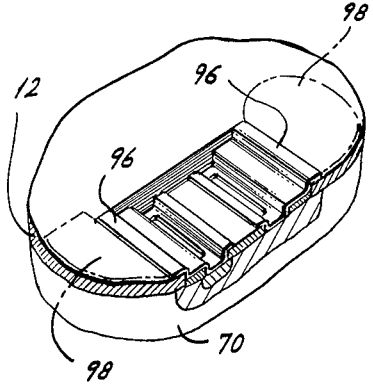
FIGURE 11 is a greatly enlarged fragment of a semiconductive wafer depicting details of a semiconductor device fabricated in accordance with the present invention.

A sectional perspective of a finished semiconductor device is depicted in FIGURE 11. For simplicity of illustration the contact lands 96 have been shown throughout the drawings as having a rectangular configuration. To facilitate the attachment of leads as by thermocompression bonding the land areas may be constructed with an enlarged surface area overlying the oxide such as shown by dashed line 98.

To afford a better appreciation of the problem for which this invention provides a unique solution it should be recognized that the current state of the mechanical reproduction art permits reproductions to be made within a practical tolerance limitation of about $\frac{1}{10}$ mil. Accordingly, in an application involving a series of only ten reproductions, assuming a condition of maximum error, there results a one mil cumulative error. Present processes, such as the one just described, are designed to mass produce microminiaturized semiconductor devices requiring for example, a rectangular .6 x 2 mil emitter strip to be precisely located within the left or right hand half of a 3 by 2.4 mil base area. It is further desired to produce a thousand or more of such alignments within less than a one inch square area. To utilize prior art techniques to achieve this degree of precision would be undesirable from both a standpoint of expense and system complexity. It will be seen that in a situation such as the one above hypothesized that as little as a one mil error will result in complete misalignment of the base and emitter areas. Accordingly, if more than a ten element array is to be produced using prior art techniques the accuracy of the mask must be extended far beyond current practical limitations. Moreover, the heretofore assumed necessity of using separate masks for the successive production of each semiconductor element further complicates the alignment procedure by introducing still another degree of freedom requiring dimensional control.

The present invention eliminates mask-to-mask spacing error through the novel approach of using a single mask containing all the patterns necessary to the fabrication of a specific device arrayed in family groups and in which identical elements of each family group are similarly spaced from a given reference or nodal point in each pattern array, which point is repeated in each array and defines the starting point for each successive registration. By this arrangement, there is no cumulative error introduced into the system, making possible the preparation of a mask containing the requisite composite of elements necessary to the practice of this invention by application of present day microphotographic techniques.

While preferred practice, illustrative of the method and apparatus aspects of the present invention, have been depicted and described it will be understood by those skilled in the art that the invention is susceptible to changes and modifications without departing from the essential concepts thereof and, that such changes and modifications are contemplated as come within the scope of the appended claims.

I claim:

1. In the mass fabrication of semiconductor devices using a multistep photomechanical reproduction process, the steps which comprise: providing a mask containing a multiplicity of spaced arrays of element-producing areas each of which arrays comprises a set of spaced images having spacing identical to the corresponding spacing in each array and representative of elements necessary to the production of an individual semiconductor device; utilizing said mask photographically to generate, on a light-sensitized surface of a body of semiconductive material, a pattern of first images of an identical one of said elements from each of said sets; thereafter positioning said mask so as to align a second one of said images of each set with a representation of the image previously produced from that set whereby simultaneously and automatically to effect registration of the second image of each of said sets with the corresponding first image representation of that set, and generating by use of said mask a pattern of said second images of said sets.

2. In the method of simultaneously fabricating a plurality of planar, double diffused silicon transistors on a substrate of semiconductive material by a photomechanical reproduction process, the steps which comprise: providing a mask containing a multiplicity of arrays of junction and contact-defining areas each of which arrays comprises a set of images successively usable in the fabrication of said transistors, the spacing of images in any array being identical with the image spacing in every other array; utilizing said mask simultaneously to generate on a light-sensitized surface of said substrate a pattern of a first one of said junction-defining areas of each of said sets; processing said semiconductive material to produce junctions originally defined by said first one of said junction-defining areas; repositioning said mask relative to said substrate to align a second junction-defining area of one of said sets with the first-produced image of that set, whereby simultaneously to register each of said second junction-defining areas of each of said sets with a representation of its corresponding first junction-defining area, and generating in a photosensitive layer applied to surface portions of said substrate a pattern of said second junction-defining areas of each of said sets by use of said mask.

3. In the fabrication of solid state devices by a multistep photomechanical reproduction process, the steps which comprise: providing a photomask containing a plurality of spaced arrays of element-producing areas each of which arrays comprises a set of images successively utilizable in the fabrication of an individual solid state device, and the corresponding images of each array being identically spaced from a given reference point in each array; utilizing said mask to generate on a sensitized surface of a body of semiconductive material a pattern of a first one of said images; thereafter utilizing said mask to effect alignment of a second one of said images of a given array with a representation of the image previously produced from that array simultaneously and automatically to effect registration of the identical second images of each of said arrays with the corresponding first image representations of those arrays, and generating in a light-sensitized layer applied to surface portions of said body of semiconductor material a pattern of said second images of each of said arrays by use of said mask.

4. In the mass fabrication of multi-element semiconductor devices using a multistep photomechanical reproduction process, the steps which comprise: providing a mask containing a multiplicity of spaced arrays of element-producing areas each of which arrays comprise a set of images necessary to the production of an individual semiconductor device, the spacing of images in any array being identical with the image spacing in every other array; utilizing said mask photographically to generate in a light-sensitized layer applied to surface portions of a body of semiconductive material, a pattern of images of an identical one of said elements from each of said sets; thereafter positioning said mask so as to align a second one of said images of each set with the image remnant previously produced whereby simultaneously to effect registration of each of said second images of said set with a remnant of said first image of that set, and generating in a light-sensitized layer applied to surface portions of said body of semiconductive material a pattern of said second images of said sets by use of said mask.

5. In the process of mass generating a plurality of individual multi-element semiconductor devices in a crystal of semiconductive material, which process includes the repetitive formation, in photosensitive material disposed on oxide-coated surface portions of said crystal, of latent images necessary to the formation of elements of said semiconductor devices, the steps which comprise: providing a photomask containing a multiplicity of spaced arrays each containing at least two images necessary to the production of an individual semiconductor device, corresponding images of the several arrays being equally spaced from a given reference point in each array; providing a layer of photosensitive material on oxide-coated surface portions of said crystal; utilizing said photomask to generate simultaneously, in said photosensitive material, a plurality of latent patterns of a first one of said images; removing said photosensitive material in the areas of said latent images; producing apertures in the oxide exposed by removal of said photosensitive material, and forming oxide-coated junctions in the semiconductive material in the region of said apertures; providing a second layer of photosensitive material on the oxide coating overlying said junctions; aligning a second one of said images of each array with said junctions previously produced, whereby automatically and simultaneously to effect registration of identical second images of each of said arrays with their corresponding junctions; and utilizing said photomask to generate in said second layer of photosensitive material patterns of a second one of said images.

6. In the process of mass generating a plurality of individual multi-element semiconductor devices in a crystal of semiconductive material, which process includes the repetitive formation, in photosensitive material disposed on oxide-coated surface portions of said crystal, of latent images necessary to the formation of elements of said semiconductor devices, the steps which comprise: providing a photomask containing a multiplicity of spaced arrays each containing at least two images necessary to the production of an individual semiconductor device, corresponding images of the several arrays being equally spaced from a given reference point in each array; providing a layer of photosensitive material on oxide-coated surface portions of said crystal; utilizing said photomask to generate simultaneously, in said photosensitive material, a plurality of latent patterns of a first one of said images; removing said photosensitive material in the areas of said latent images; producing apertures in the oxide exposed by removal of said photosensitive material, and forming oxide-coated junctions in the semiconductive material in the region of said apertures; providing a second layer of photosensitive material on the oxide coating overlying said junctions; aligning a second one of said images of each array with said junctions previously produced, whereby automatically and simultaneously to effect registration of identical second images of each of said arrays with their corresponding junctions; utilizing said photomask to generate in said second layer of photosensitive material patterns of a second one of said images; and processing said crystal to produce a second set of junctions.

References Cited by the Examiner

UNITED STATES PATENTS

| | | | |
|---|---|---|---|
| 1,736,445 | 11/1929 | Jannenga | 96—43 |
| 2,124,680 | 7/1938 | Wilkinson | 96—43 |
| 2,224,269 | 12/1940 | McIntosh | 96—41 |
| 2,226,987 | 12/1940 | Wiegand | 96—43 |
| 2,610,413 | 9/1952 | Dasey | 96—43 |
| 2,752,245 | 6/1956 | Hough et al. | 96—43 |
| 2,972,533 | 2/1961 | Frankau et al. | 96—43 |
| 3,025,589 | 3/1962 | Hoerni | 156—17 |
| 3,046,176 | 7/1962 | Bosenberg | 96—35 |
| 3,110,594 | 11/1963 | Howe et al. | 96—44 |

OTHER REFERENCES

Barrows et al.: Electronics, Apr. 7, 1961, pp. 102–104 and 105.

Swiggett: Intro. to Printed Circuits, 1956, John F. Rider Publisher, Inc., N.Y., pp. 25–41.

NORMAN G. TORCHIN, *Primary Examiner.*

A. D. RICCI, R. H. SMITH, *Assistant Examiners.*